United States Patent
Bertsch

(10) Patent No.: US 12,278,442 B2
(45) Date of Patent: Apr. 15, 2025

(54) CONTACT ASSEMBLY FOR PLUG CONNECTIONS, I.E., CHARGING PLUGS, COMPRISING A COOLING DEVICE

(71) Applicant: Amphenol Tuchel Industrial GmbH, Heilbronn (DE)

(72) Inventor: Michael Bertsch, Heilbronn (DE)

(73) Assignee: AMPHENOL TUCHEL INDUSTRIAL GMBH, Heilbronn (DE)

( * ) Notice: Subject to any disclaimer, the term of this patent is extended or adjusted under 35 U.S.C. 154(b) by 308 days.

(21) Appl. No.: 17/780,972

(22) PCT Filed: Nov. 25, 2020

(86) PCT No.: PCT/EP2020/083335
§ 371 (c)(1),
(2) Date: May 28, 2022

(87) PCT Pub. No.: WO2021/105196
PCT Pub. Date: Jun. 3, 2021

(65) Prior Publication Data
US 2023/0006385 A1    Jan. 5, 2023

(30) Foreign Application Priority Data
Nov. 28, 2019   (DE) .......................... 102019132390.8

(51) Int. Cl.
*H01R 13/00*   (2006.01)
*B60L 53/16*   (2019.01)
(Continued)

(52) U.S. Cl.
CPC ............ *H01R 13/005* (2013.01); *B60L 53/16* (2019.02); *B60L 53/302* (2019.02); *H01R 4/183* (2013.01)

(58) Field of Classification Search
CPC ..... H01R 13/005; H01R 4/183; B60L 53/302; B60L 53/16
(Continued)

(56) References Cited

U.S. PATENT DOCUMENTS

2015/0217654 A1   8/2015   Woo et al.
2018/0075946 A1*  3/2018   Beimdieck ........... H01R 13/005
(Continued)

FOREIGN PATENT DOCUMENTS

CN   107887730 A   4/2018
CN   207664267 U   7/2018
(Continued)

OTHER PUBLICATIONS

International Search Report with English Translation for International Application No. PCT/EP2020/083335; International Filing Date: Nov. 25, 2020; Date of Mailing: Feb. 23, 2021; 5 pages.
(Continued)

*Primary Examiner* — Gary F Paumen
(74) *Attorney, Agent, or Firm* — CANTOR COLBURN LLP

(57) ABSTRACT

The invention relates to a contact assembly for plug connections, i.e., charging plugs, for transmitting electric power, having at least one device for producing an electrically conductive connection and at least one device for cooling purposes, i.e., for dissipating heat produced by the transmission of electric power using the conductive connection, wherein the electrically conductive device has at least one connection region for coupling to at least one cooling area border and at least one contact region, and the coupling is carried out directly in an integrative manner so that the cooling effect is supported as a result of the at least partly direct physical contact between the electrically conductive device and the coolant. The invention additionally relates to
(Continued)

plug connections, i.e., charging plugs, comprising at least one such contact assembly.

14 Claims, 3 Drawing Sheets

(51) Int. Cl.
 *B60L 53/302* (2019.01)
 *H01R 4/18* (2006.01)
(58) Field of Classification Search
 USPC .......................................................... 439/485
 See application file for complete search history.

(56) References Cited

U.S. PATENT DOCUMENTS

2019/0135131 A1 5/2019 Wenz
2019/0315239 A1* 10/2019 Beimdieck .............. B60L 53/16

FOREIGN PATENT DOCUMENTS

| CN | 208368882 U | 1/2019 |
| CN | 208849150 U | 5/2019 |
| CN | 110289513 A | 9/2019 |
| CN | 209625887 U | 11/2019 |
| DE | 102010007975 B4 | 8/2011 |
| DE | 102016105470 A1 | 9/2017 |
| DE | 102016204895 A1 | 9/2017 |
| DE | 102016117261 B3 | 11/2017 |
| DE | 102016112306 A1 | 1/2018 |
| DE | 102018100824 A1 | 7/2019 |
| EP | 3043421 A1 | 7/2016 |
| WO | 2012051510 A2 | 4/2012 |

OTHER PUBLICATIONS

Written Opinion with English Translation for International Application No. PCT/EP2020/083335; International Filing Date: Nov. 25, 2020; Date of Mailing: Feb. 23, 2021; 16 pages.

* cited by examiner

CONTACT ASSEMBLY FOR PLUG CONNECTIONS, I.E., CHARGING PLUGS, COMPRISING A COOLING DEVICE

CROSS REFERENCE TO RELATED APPLICATIONS

This application is a National Stage application of PCT/EP2020/083335, filed Nov. 25, 2020, which claims the benefit of German Patent Application Serial No. 102019132390.8, filed Nov. 28, 2019, both of which are incorporated by reference in their entirety herein.

FIELD

The disclosure relates generally to a contact arrangement for plug connections, and more particularly to a contact arrangement for transmitting electric power.

BACKGROUND

Contacts generally have at least one electrically conductive contact portion for releasable, temporary or plug-in connection to a corresponding mating contact element and a shaft portion adjoining the contact portion for fastening an electric line to the contact. Such a contact, plug contact, high-current contact, can be used on a charging plug or a charging socket, for example for charging an electrically driven vehicle. In this case, a cable is connected to a charging station on the one hand and, on the other, supports a plug connector part in the form of a charging plug, which can be plugged into an associated mating plug connector part in the form of a charging socket on a vehicle in order to thus produce an electrical connection between the charging station and the vehicle.

Charging currents can essentially be transmitted as direct currents or as alternating currents, wherein in particular charging currents and high-current ranges in the form of direct current have a high current strength, for example higher than 200 A or even higher than 300 A or even 350 A and can lead to heating of the cable as well as a high-current contact connected to the cable.

During a charging procedure for electric energy stores, accumulators, heat is generated as a result of the high transmitted electric powers, electric currents, not only at the cable by means of which a charging plug is connected for example to a charging station, but also at the charging plug and in particular within the charging plug, for example at high-current contacts, via which an electrical contact with associated mating contacts, for example of a charging socket, on an electric vehicle is produced when the charging plug is plugged into the charging socket and the electric power is transmitted.

Such high-current contacts, which are manufactured from an electrically conductive material, for example from a copper material, become heated when a charging current flows over the contacts, plug contacts, high-current contacts, wherein the contacts should essentially be dimensioned according to the charging current to be transmitted, such that the contacts have a sufficient current-carrying capacity and heating at the contact elements is restricted. It is the case here that the dimensions of a contact need to increase with an increase in the charging current to be transmitted. However, scaling the contact element size according to the increasing charging current is subject to limits due to the associated spatial requirement, weight and costs. There is therefore a need for a high charging current to be transmitted via a contact which has comparatively small dimensions.

High charging currents are particularly important with regard to the desired electromobility. Only thus can electric vehicles or the energy store thereof be "refueled" in a short time.

An approach to the problem which is essentially known in the prior art is to passively or actively cool contacts, high-current contacts, in order to also realize the transmission of the electric power with restricted heating of the power-transmitting components in structural elements with small dimensions.

DE 10 2016 204 895 A1 discloses a power contact system for a charging plug and/or a charging socket and a charging plug for coupling to a corresponding connecting device and for transmitting electric energy. The object to be achieved consists in providing a charging plug by means of which higher charging currents can be transmitted without the charging plug becoming excessively heated.

As a solution, a power contact system for a charging plug and/or a charging socket is proposed, which has a power contact with a first connection region for galvanic connection to an electric energy receiver and a second connection region for galvanic connection to a charging cable.

A cooling element which is in direct contact with the second connection region of the power contact is provided, wherein the cooling element has a cooling-fluid feed connection and a cooling-fluid discharge connection fluidically connected thereto by means of a cooling-fluid channel arranged within the cooling element. The cooling-fluid feed connection and the cooling-fluid discharge connection are arranged in the cooling-element cover and are connected to the cooling element such that a flow can pass through, which cooling element is designed in such a way that cooling fluid is not in direct contact with the power contact.

US 2015/0217654 A1 by Tesla Motors discloses a charging system for an electric vehicle, having a power supply, a cable with a first and a second end, wherein the first end is fastened to the power supply, wherein the cable comprises a charging wire and a cooling line, each of which extends from the first end to the second end; and a connector, which is fastened to the second end of the cable, wherein the connector has a form factor which corresponds to a charging station of the electric vehicle; wherein the cooling line is suitable for transporting a fluid which cools the charging wire, line. The cooling line and the current-carrying charging wire, line, are conveniently arranged as a line bundle.

A charging cable with contacts, high-current contacts, which is known from DE 10 2010 007 975 B4 has a cooling line, which comprises a supply line and a return line for a coolant and therefore enables a coolant flow back and forth in the charging cable. In this case, the cooling line of DE 10 2010 007 975 B4 serves for dissipating thermal losses generated at an energy store of a vehicle, but moreover also for cooling the cable per se. In order to achieve the cooling effect of the charging cable, the charging cable is arranged concentrically within the cooling line and cooling medium flows around it.

An electrical connection body for a charging plug with a cooling device is disclosed in EP 3 043 421 A1. An electrical connection body for a charging plug and/or a charging socket is presented, which has a first connection region for galvanic connection to an electric energy receiver and a second connection region for galvanic connection to an electric energy source and wherein the electrical connection body has a cooling-fluid channel formed in the electrical connection body.

The known cooling solutions for plug connections, charging plugs, contacts, high-current contacts, are disadvantageous or in need of improvement in various aspects. The cooling-medium volume flows are often insufficient owing to the reduced cross-sections of the feed and discharge lines to and from the cooling element. The volume of the cooling element is also undersized in many cases.

A further problem relating to effective cooling is revealed by the often insufficient heat transfer between the zones and regions with a higher temperature and the cooling medium. This is caused in many cases by the too small contact surfaces between the components or contacts to be cooled and the contact elements. The cooling-medium-carrying and the high-current-carrying components are usually separate, self-contained elements with the resultant reduced heat transfer between them.

Many available cooling devices are designed in such a way that only sections of the high-current contacts are exposed to cooling power. Often, only the contact regions with the mating plug are cooled or it is the lines which are subject to a cooling effect. The connecting portions between the line and contact are then usually only cooled when the electrically conductive supply lines are braid-like structures.

In terms of safety, many provided cooling solutions for high-current contacts are also unconvincing. The available cooling devices do not offer protection or an emergency function in the event of a failure of the cooling, for example as a result of defects of the cooling-medium pump or interruptions in the supply or discharge of the cooling medium.

SUMMARY

As discussed herein, cooling solutions may be further developed for contact arrangements, contacts, high-current contacts, so that the above-mentioned disadvantages of the prior art are at least partly reduced and the reliability of the cooling is improved.

It is noted that, in addition to cooling the contact, high-current contact, to increase the current to be transmitted whilst maintaining the same line cross-section, a direct connection of the conductor and cooling hose to the contact element, high-current contact, is suitable for achieving substantial cooling improvements. The direct connection, in an integrative manner, facilitates both the conduction of the electric energy and the direct, improved heat transfer between the heated line components and the cooling medium as a result of the direct physical contact.

As a result of the arrangement of the contact elements, high-current contacts, in the contact carrier, connecting element and therefore in the cooling element, an additional cooling-medium safety reservoir can be created, which can act as a buffer in the event of a fault, for example a lack of cooling-medium circulation, cooling-medium volume flow, or the failure of the cooling-medium pump. The outer cooling-medium hose facilitates a larger cross-sectional surface compared to feed and discharge hoses which are arranged parallel to the electric conductor, so that an increased cooling-medium volume flow is possible.

Structurally, the current-carrying conductor, line, is located within the cooling hose. The conductor and the cooling hose are directly connected to the connecting element, contact carrier. The connecting element, contact carrier, has at least one transverse bore through which the cooling medium can be fed into and out of a reservoir which forms the cooling element.

If there are contact arrangements in plug connections within charging systems for an electric vehicle, two contact arrangements, high-current contacts, are usually arranged in a charging plug. This variant provides two cooling-medium hoses. By way of example, a DC positive pole conductor is located in one hose and the DC negative pole conductor is located in one hose. One cooling-medium hose is used as a supply line for cooling medium, one is used as a return line. Both hoses can be fluidically coupled via the cooling element.

The disclosure provides a cooling medium which is formed as an electric insulator and non-conductive liquid is therefore present. It is thus possible to couple the current-carrying and cooling-medium-carrying components directly in an integrative manner so that the cooling effect is facilitated as a result of the at least partly direct physical contact between the electrically conductive device and the cooling medium.

A range of advantages are associated with the configuration according to the disclosure:
- as a result of the current-carrying conductor, current supply line, located within the cooling hose, this conductor can be crimped to the contact, high-current contact, in a simple and reliable manner by means of a conventional crimping process, the use of a braid which hinders the connection is not required,
- the feed and discharge cross-section of the cooling-medium-conducting components, cooling-medium hose, is greater than that of individual hoses so that a greater cooling-medium volume flow can be realized,
- the crimp region of the high-current contact, contact, is located entirely in the non-conductive cooling liquid so that insulation does not hinder the heat transfer, as in the prior art,
- the elasticity and mobility of the overall current- and cooling-medium-conducting arrangement and a compact configuration are facilitated,
- the heating of the device both in normal-load operation and in the case of an interruption in the event of a failure of the cooling-medium volume flow is restricted as a result of the structural configuration and dimensioning of a cooling-medium reservoir.

BRIEF DESCRIPTION OF THE DRAWINGS

The disclosure is explained in more detail below with reference to an exemplary embodiment in conjunction with the figures, in which.

DETAILED DESCRIPTION

Figure 1A:
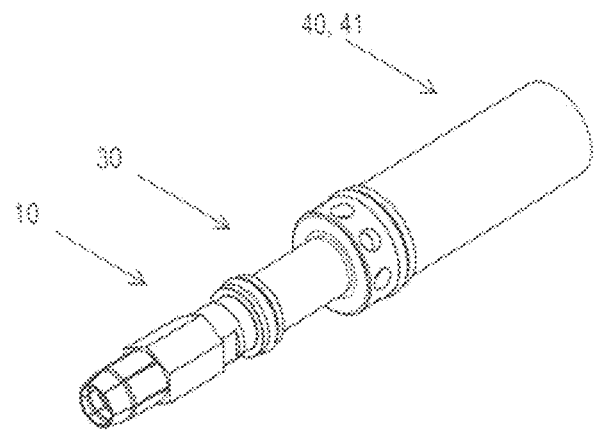
FIG. 1a shows a perspective view of the contact arrangement with a contact and a cooling hose coupled by a connecting region.

FIG. 1a comprises a perspective view of the contact arrangement with a contact region 10 and a component of the cooling-chamber delimitation 40, realized by a cooling hose 41, coupled by and to a connecting region 30.

Figure 1B:
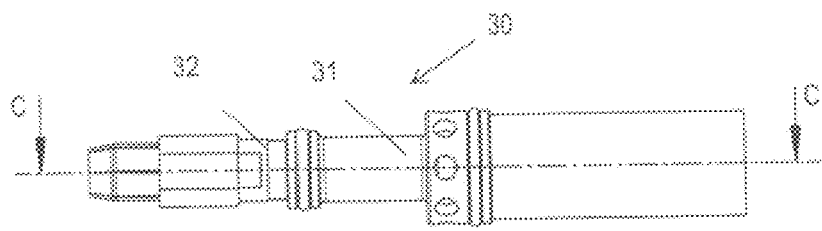
FIG. 1b shows, in the top illustration, a front view of the contact arrangement with a connecting region formed by at least one connecting element, contact carrier with a contact receptacle, and, in the bottom illustration, the sectional plan view C-C.
Figure 1B:
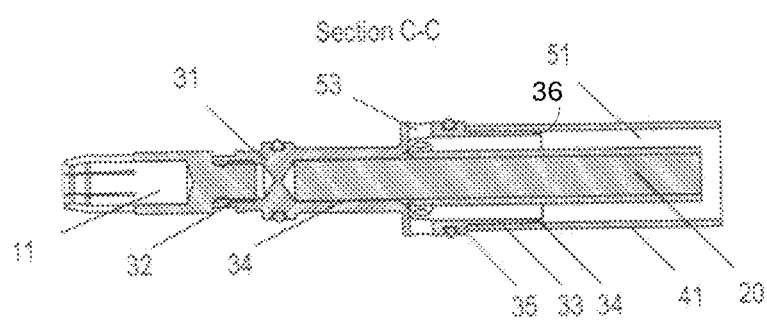

FIG. 1b shows, in the top illustration, a front view of the contact arrangement with a connecting region 30, formed by at least one connecting element 31 with a contact receptacle 32 and, in the bottom illustration, the sectional plan view C-C.

The connecting region 30 couples the at least one contacting means 11, via the contact receptacle 32, to a hose receptacle 33 in both an electrically conductive and cooling-medium-carrying manner substantially by means of the connecting element, contact carrier 31. The receptacles 32, 33 of this exemplary embodiment are designed to be both flush and concentric with the center axis and are functionally supplemented by a receptacle 34 for the electric conductor 20, in a likewise flush and concentric manner. The connecting element 31 is preferably produced from a material with electrical conductivity and heat-conducting properties.

In the exemplary embodiment shown, the contact receptacle 32 and the line receptacle 34 in the connecting element 31 are designed as bores, holes, blind holes with or without internal threads, which are incorporated at the end faces and axially in each case and—if designed as a blind-hole—can have, at the end face, a ca. 120° angular tip as a result of a drill bit. A through-bore with a constant or varying diameter is also possible.

The region of the contact receptacle 32 is preferably, but not necessarily, provided with an internal thread, which is designed to be compatible with an adapter or the contacting means 11 in such a way that the contacting means 11 can be fixed in place by or in the connecting element, contact carrier 31. The region of the line receptacle 34 is configured in such a way that a line 20 can be fixed in place. The coupling can take place by means of a press fit, by means of a crimping procedure or by means of clamping elements within the connecting element 31. Owing to the particularly reliable connecting properties of a crimp connection, this is often a preferred solution.

An end face of the connecting element 31 is designed as a hose receptacle 33 for coupling a cooling hose 41. In the simplest geometrical configuration, the hose receptacle 33 is formed by a cylindrical portion onto which the hose 41 can be pushed axially. The hose 41 can be fixed in place for example by clamps, hose clamps or a press fit. The hose receptacle 33 can then be optionally supplemented by a hose stop 35 in the form of a shoulder in the pushing-on direction and/or an end-face chamfer, insertion bevel 36.

Figure 2:
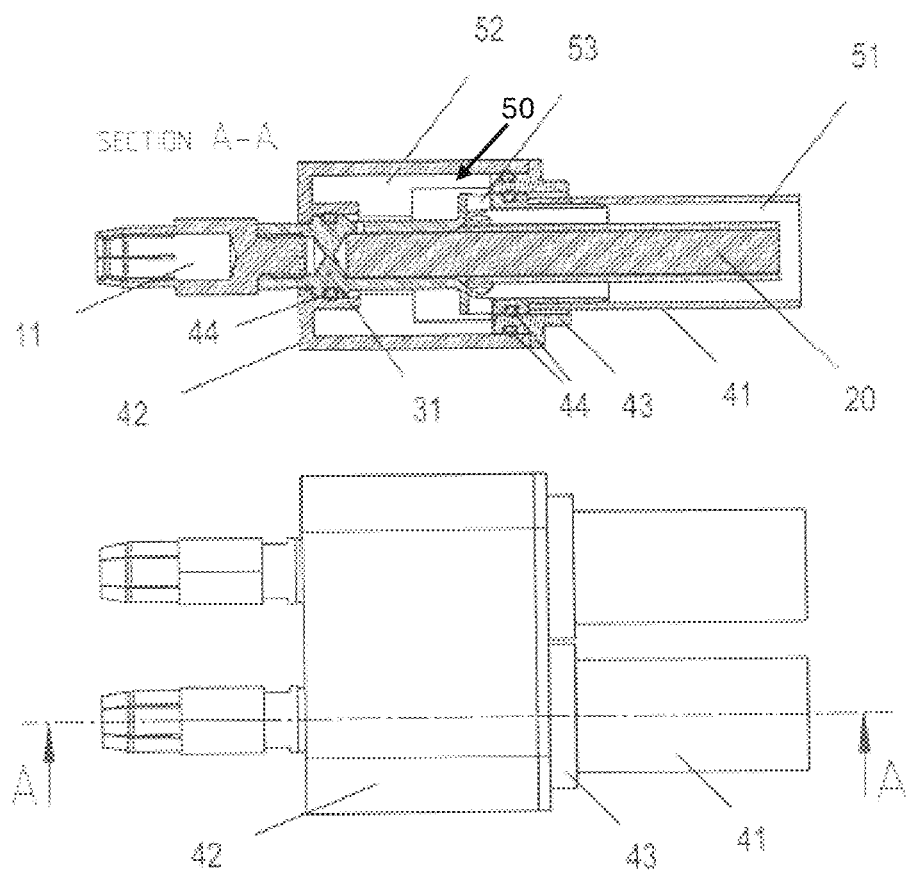
FIG. 2 shows, in the top illustration, a sectional front view A-A of a contact element with a cooling-chamber delimitation and, in the bottom illustration, the plan view of a contact combination consisting of a first and a second contact arrangement having a common cooling-chamber delimitation, at least in sections.

FIG. 2 shows, in the top illustration, a sectional front view A-A of a contact element with an outer cooling-chamber delimitation 40, which is formed substantially by at least one cooling hose 41 and at least one cooling housing 42. The outer cooling-chamber delimitation 40 forms the encapsulation, outer delimitation, of the at least one cooling element 50 with its connection cooling region 52, e.g., cooling reservoir 52, and the at least one line cooling region 51.

A cooling-housing adapter 43 can be optionally provided to couple the cooling housing 42 to the connecting element 31. In addition to production-related advantages due to the simplified geometry of the connecting element 31, the cooling reservoir 52 can be enlarged in terms of its volume and/or adapted to the respective required cooling power without having to alter the geometry of the contact arrangement. The use of similar parts for the contact arrangement is therefore also facilitated when different cooling powers are required, so that different variants of the contact arrangement are not required. The production and the costs thereof as well as storage and parts logistics can thus be realized in a cost-effective manner.

The sealing of the outer cooling-chamber delimitation 40 can take place with or without a cooling-housing adapter 43 by means of seals 44. In particular in the case of rotationally symmetrical sealing flanges, O-rings with a preferably circular cross-section have proven effective, which O-rings are inserted into a corresponding groove with a groove depth which is smaller than the ring diameter.

The outer cooling-chamber delimitation 40 cooperates functionally with the inner cooling-chamber delimitation, formed substantially by the line 20 and the connecting element 31. The geometrical design results in a considerably improved heat transfer of the current-carrying components 20, 31 within the outer cooling-chamber delimitation 40 as a result of the direct physical contact with the cooling medium. The disclosure provides for the use of cooling medium which is designed as an electric insulator and an electrically non-conductive liquid is therefore present.

A further measure for improving the cooling power is the inventive fluidic coupling of the line cooling region 51 and connection cooling region 52. The fluidic coupling is achieved by means of at least one cooling connection, opening 53, which connects both regions 51, 52 in such a way that a cooling-medium volume flow or cooling-medium exchange between both regions is facilitated. The cooling-medium movement between the line cooling region 51 and connection cooling region 52 can take place by means of a cooling-medium volume flow due to circulation as a result of temperature gradients within the medium or the components adjacent to the medium and/or by means of a feed and discharge combined with a cooling-medium pump. If two or more contact arrangements with a cooling-chamber delimitation 40 are used and the cooling-media chambers are coupled to facilitate the volume flow, the line cooling regions 51 can be used as a feed and return, discharge. FIG. 2 shows this variant by way of example for two contact arrangements in the bottom illustration. The shown contact combination consists of a first and a second contact arrangement having a common cooling-chamber delimitation 40, at least in sections. The cooling-chamber delimitation 40 is designed in such a way that a cooling-medium volume flow between the contact arrangements is facilitated.

Figure 3:
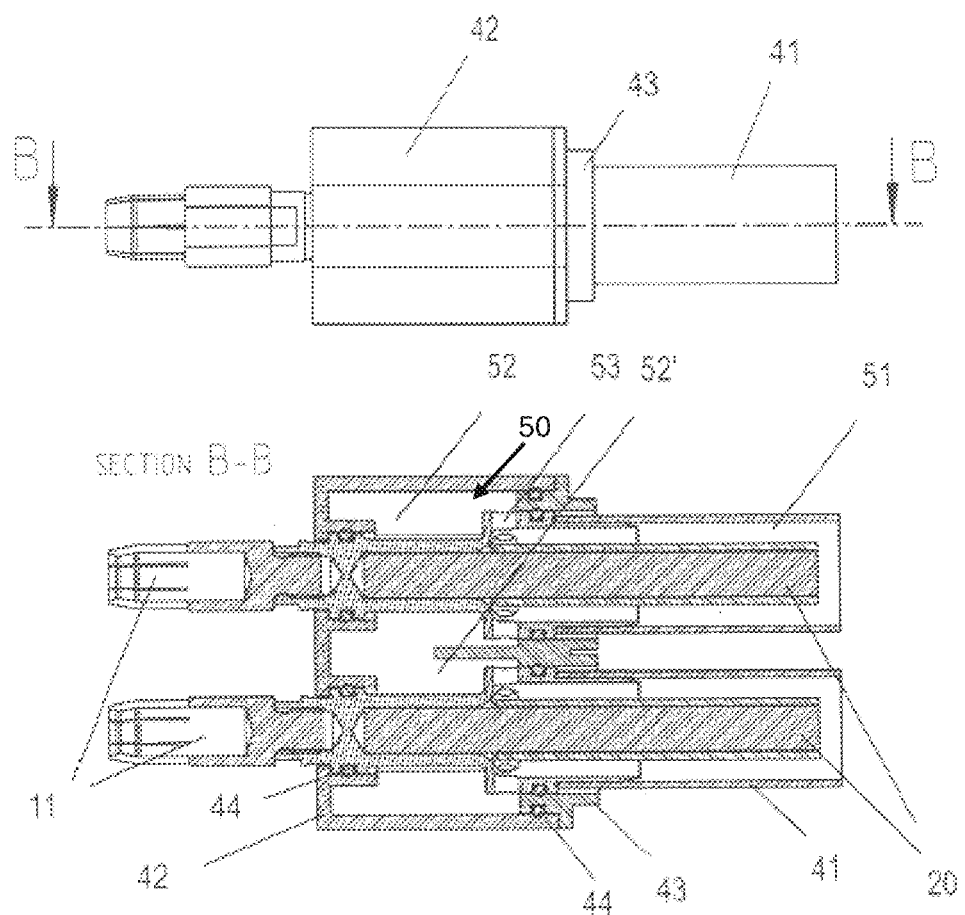
FIG. 3 shows, in the top illustration, a front view of a contact element with a cooling-chamber delimitation and, in the bottom illustration, the sectional plan view B-B of a contact combination consisting of a first and a second contact arrangement having a common cooling-chamber delimitation, at least in sections.

FIG. 3 shows, in the top illustration, a front view of a contact element with a cooling-chamber delimitation 40, which is formed substantially by at least one cooling hose 41 and at least one cooling housing 42 and can be supplemented by a cooling-housing adapter 43.

In the bottom illustration of FIG. 3, the sectional plan view B-B of a contact combination consisting of a first and a second contact arrangement having a common cooling-chamber delimitation 40, at least in sections, is shown. The cooling-chamber delimitation 40 forms a cooling center region 52' so that a cooling-medium volume flow between the contact arrangements is facilitated. As a result of the annular connection or volume-flow channel formed in this way, a cooling-medium flow between the line cooling regions 51 can be generated.

The invention claimed is:

1. A contact arrangement comprising:
   at least one device for producing an electrically conductive connection; and
   at least one cooling device for configured to cool heat dissipation of the heat generated from the transmission of electric power by the conductive connection, the at least one cooling device comprising a line cooling region and a connection cooling region that surrounds the line cooling region,
   wherein the electrically conductive device has at least one connecting region for coupling to at least one cooling-chamber delimitation and at least one contact region,
   wherein the coupling of the at least one cooling-chamber delimitation and at least one contact region takes place directly in an integrative manner so that the cooling effect is facilitated as a result of the at least partly direct physical contact between the electrically conductive device and the cooling medium, and
   wherein a fluid coupling of the cooling region and the line cooling region takes place through at least one opening in the connecting element so that a cooling-medium volume flow between the line cooling region and the surrounding connection cooling region is facilitated.

2. The contact arrangement as claimed in claim 1, wherein a contacting means is receivable within the at least one contact region.

3. The contact arrangement as claimed in claim 1, wherein the connecting region is formed substantially by a connecting element having at least one contact receptacle.

4. The contact arrangement as claimed in claim 1, wherein the connecting element has at least one hose receptacle.

5. The contact arrangement as claimed in claim 4, wherein the hose receptacle is supplemented by a chamfer and/or by a hose stop.

6. The contact arrangement as claimed in claim 1, wherein the connecting element has at least one line receptacle.

7. The contact arrangement as claimed in claim 6, wherein the line receptacle comprises a crimp connection.

8. The contact arrangement as claimed in claim 1, wherein the at least one cooling-chamber delimitation is formed externally by the at least one cooling hose that defines the line cooling region, which is couple-able to the connecting region, and at least one cooling housing that surrounds the at least one cooling hose and that defines the connection cooling region.

9. The contact arrangement as claimed in claim 8, wherein the cooling housing is coupled to the connecting region by a cooling-housing adapter.

10. The contact arrangement as claimed in claim 8, wherein the cooling housing, with the connecting region, forms a connection cooling region in which cooling medium is receivable.

11. The contact arrangement as claimed in claim 8, wherein the connecting or coupling regions between the cooling housing and/or the cooling-housing adapter and/or the connecting regions are sealed by sealing elements.

12. A plug connection, for transmitting electric energy, in particular in the high-current range, having at least one contact arrangement as claimed in claim 1.

13. The plug connection as claimed in claim 12, wherein the plug connection, charging plug, is formed by at least two contact arrangements, wherein at least one cooling center region is formed by the mutually adjoining cooling elements with their connection cooling regions.

14. The plug connection as claimed in claim 13, wherein the cooling center region facilitates the cooling-medium volume flow from a first line cooling region, via a first connection cooling region, to a second connection cooling region and a second line cooling region.

* * * * *